(12) United States Patent
Testin et al.

(10) Patent No.: US 7,532,251 B2
(45) Date of Patent: May 12, 2009

(54) VARIABLE INTENSITY ILLUMINATION DEVICE WITH DETECTION AND CONTROL CIRCUIT FOR A FRONT PANEL OF A TELEVISION APPARATUS

(75) Inventors: William John Testin, Indianapolis, IN (US); William Patrick McCarthy, Indianapolis, IN (US); John Edward Nicholson, Indianapolis, IN (US)

(73) Assignee: Thomson Licensing, Boulogne-Billancourt (FR)

( * ) Notice: Subject to any disclaimer, the term of this patent is extended or adjusted under 35 U.S.C. 154(b) by 644 days.

(21) Appl. No.: 10/554,262

(22) PCT Filed: Apr. 20, 2004

(86) PCT No.: PCT/US2004/012264

§ 371 (c)(1),
(2), (4) Date: Oct. 25, 2005

(87) PCT Pub. No.: WO2004/098181

PCT Pub. Date: Nov. 11, 2004

(65) Prior Publication Data

US 2006/0203136 A1    Sep. 14, 2006

Related U.S. Application Data

(60) Provisional application No. 60/465,845, filed on Apr. 25, 2003.

(51) Int. Cl.
*H04N 5/445* (2006.01)
(52) U.S. Cl. .................................... 348/553
(58) Field of Classification Search ............... 348/552, 348/553, 730, 801, 569; 368/10; 345/102, 345/169, 168; 362/109, 85, 276; 713/10
See application file for complete search history.

(56) References Cited

U.S. PATENT DOCUMENTS 5,091,873 A * 2/1992 Araki .......................... 361/681

(Continued)

FOREIGN PATENT DOCUMENTS

EP    1 257 122 A2    11/2002

(Continued)

OTHER PUBLICATIONS

Search Report dated Sep. 30, 2004.

*Primary Examiner*—Paulos M Natnael
(74) *Attorney, Agent, or Firm*—Robert D. Shedd; Joseph J. Opalach; Reitseng Lin

(57) ABSTRACT

A variable intensity light device is provided to illuminate front panel user buttons in a television apparatus. The television apparatus allows user control of the level of light intensity preferably via an on-screen menu. Automatic detection circuitry/logic is also provided that detects whether a light such as an LED is present upon initial user set-up. This allows the inclusion of the light device in televisions whose controllers are already designed. Moreover, the light device preferably utilizes a single wire for light presence detection and intensity control. Detection of the light causes the television apparatus to include a light control on-screen menu in the main television on-screen menu. Preferably, the light control menu allows the user selection of at least six different brightness or intensity levels for the light. In one form, the light is a diode that provides blue light though a light pipe.

14 Claims, 4 Drawing Sheets

U.S. PATENT DOCUMENTS

| | | | | |
|---|---|---|---|---|
| 5,379,201 A | * | 1/1995 | Friedman | 362/191 |
| 5,929,943 A | * | 7/1999 | Bell et al. | 348/730 |
| 6,161,156 A | * | 12/2000 | Suzuki et al. | 710/300 |
| 6,161,944 A | * | 12/2000 | Leman | 362/276 |
| 6,289,466 B1 | * | 9/2001 | Bayramoglu et al. | 713/310 |
| 6,464,633 B1 | * | 10/2002 | Hosoda et al. | 600/178 |
| 6,561,668 B2 | * | 5/2003 | Katayama et al. | 362/85 |
| 6,999,059 B2 | * | 2/2006 | Kim | 345/102 |
| 7,209,187 B2 | * | 4/2007 | Mears et al. | 348/730 |
| 7,379,393 B2 | * | 5/2008 | Morykwas et al. | 368/10 |
| 2002/0018050 A1 | * | 2/2002 | Turner | 345/169 |
| 2002/0064055 A1 | | 5/2002 | Takahashi et al. | |
| 2002/0158813 A1 | * | 10/2002 | Kiyokawa et al. | 345/7 |

FOREIGN PATENT DOCUMENTS

| | | |
|---|---|---|
| FR | 1 283 308 | 2/1962 |
| FR | 2 769 159 | 4/1999 |

* cited by examiner

VARIABLE INTENSITY ILLUMINATION DEVICE WITH DETECTION AND CONTROL CIRCUIT FOR A FRONT PANEL OF A TELEVISION APPARATUS

This application claims the benefit, under 35 U.S.C. §365 of International Application PCT/US04/012264, filed Apr. 20, 2004, which was Published in accordance with PCT Article 21(2) on Nov. 11, 2004, in English and which claims the benefit of United States provisional patent application No. 60/465,845, filed Apr. 25, 2003.

BACKGROUND

1. Field of the Invention

The present invention relates to illumination of a keypad of a television apparatus and, more particularly, to an electronic circuit for detecting the presence of an illumination device and controlling the intensity of a keypad illumination light in a television apparatus.

2. Background Information

Current electronic devices such as televisions utilize a remote control to generate and send commands to the television which the television then performs. All of the features and/or functions of the electronic device are thus accessible through the remote. A problem with remote controls is that they can be misplaced, lost or temporarily unavailable. When the remote is not available, the features and/or functions of the television are not accessible. For this reason, electronic devices such as televisions include buttons, keys or the like on the chassis of the television that provides user access to at least some of the basic features and/or functions of the television. This allows the television to be operated, at least in a limited manner, without the remote. The user buttons or keys are typically provided on a front panel of the television for easy access by the user.

While such user buttons are provided on the television, they may not be easily discernable when there is insufficient ambient light. Further, some user buttons are located behind a panel, door or the like making the ability to see the user buttons and/or read any button labels difficult. Various ambient lighting conditions also hinder the ability to easily discern the user buttons.

It is thus evident from the above discussion that what is needed is a lighting device for illuminating user buttons on a front panel of a television apparatus.

It is further evident from the above discussion that what is needed is a lighting device that provides variable intensity illumination of user buttons on a front panel of a television apparatus.

These needs and others are accomplished through application of the principles of the subject invention and/or as embodied in one or more various forms and/or structures such as are shown and/or described herein.

SUMMARY

The subject invention provides for variable illumination of user buttons located in a front panel array on a television apparatus exterior. Circuitry detects the presence of an LED and, if present, adds a menu item for the user to control the intensity of the LED.

In one form, there is provided a television apparatus having a housing, a controller contained in the housing and operative to provide control of the television apparatus, a front panel array on an exterior of the housing and connected to the controller, and a lighting device situated on the exterior of the housing and illuminating the front panel array, the lighting device connected to the controller and operative in conjunction with the controller to provide a plurality of illumination intensity levels.

In another form, there is provided a method of providing a variable intensity light for a front panel array of a television apparatus. The method includes the steps of: (a) providing a lighting device on a television apparatus, the lighting device operative to illuminate a front panel array of the television apparatus; (b) detecting the presence of the lighting device upon initial startup of the television apparatus; and (c) providing a light control menu to an on-screen control menu of the television apparatus when the lighting device has been detected, the light control menu allowing a user to select one of a plurality of light illumination intensity levels for the lighting device.

BRIEF DESCRIPTION OF THE DRAWINGS

In the drawings.

Corresponding reference characters tend to indicate corresponding parts throughout the several views.

DETAILED DESCRIPTION

Figure 1:
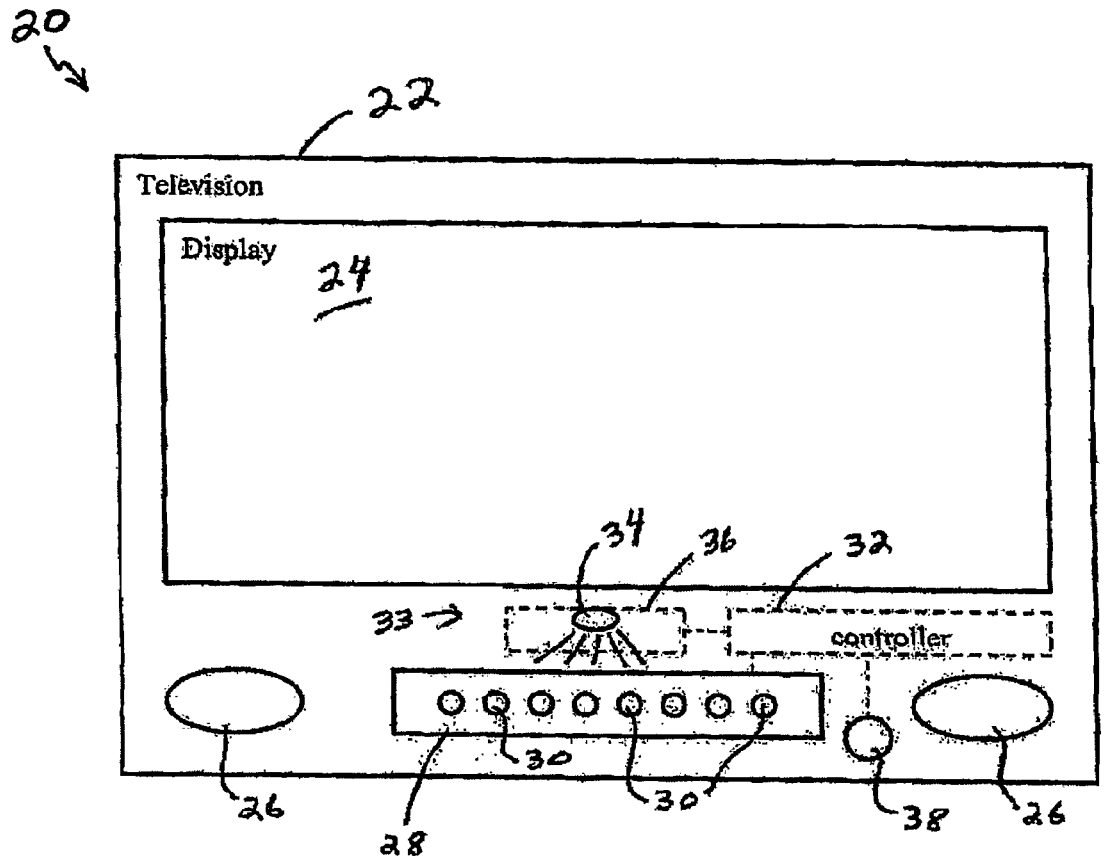
FIG. 1 is a diagrammatic view of a television apparatus in which the subject invention is embodied.

Referring now to FIG. 1, there is depicted an exemplary representation of a television apparatus (television signal receiver, television or the like), generally designated 20 and herein collectively television, in which the subject invention may be embodied. The television 20 has a chassis or body 22 that supports, houses and/or contains various typical television components such as are known in the art, and the subject invention.

The television 20 includes various television apparatus components some of which are shown and/or described herein and others that are not. It should be appreciated that the television 20 includes components not shown and/or described that are typical and/or necessary for a functioning television. In all cases, the television includes a display 24 adapted, configured and/or operative to show video, one or more speakers 26 adapted, configured and/or operative to play audio, and a controller 32 adapted, configured and/or operative to receive and process television signals and control the various television apparatus components. The controller 32 is coupled to the display 24 and the one or more speakers 26 and provides appropriate signals to show video on the display 24 and to play audio on the one or more speakers 26.

The television 20 further includes a front panel 28 that has a plurality of user buttons, keys or the like 30, the combination of which may be deemed a front panel array or front panel array of user buttons. The user buttons 30 provide control of various features and/or functions of the television 20. The user buttons 30 of the front panel 28 are connected to the controller 32 as represented by the dashed line between the front panel 28 and the controller 32 such that the buttons 30 provide appropriate signals to the controller 32.

The television 20 also includes a remote control signal sensor 38 that is coupled to the controller 32 so as to receive, interpret and/or utilize any received commands from a remote controller or remote (not shown). Alternatively, but not shown, the remote control signal sensor 38 may be coupled to signal receiving circuitry that is in turn coupled to the controller 32. In one form, the remote control signal sensor 38 is an infrared (IR) sensor or receiver and the remote outputs infrared signals. Of course, other manners of providing a remote signal and receiving of the remote signal are contemplated.

In accordance with an aspect of the subject invention, the television 20 includes a lighting or illumination device 33 having a light 34 and associated circuitry/logic 36. The light 34 is situated on the chassis 22 such that light (represented by the lines emanating from the light 34) shines on and thus illuminates the user buttons 30 on the front panel 28. The light 34 is coupled to the circuitry/logic 36 that is in turn coupled to the controller 32 (as represented by the dashed line connecting the two components). The lighting device circuitry/logic 36 is operative, either alone, in conjunction with, or by the controller 32, to regulate or control the light 34 so as to cause the light 34 to provide various levels of illumination intensity and/or a continuous range of illumination intensities from a lower intensity to a higher intensity. This variable lighting feature/function may be controlled and/or changed by the user in various manners such as via an on-screen menu or directly via the remote.

Figure 2:
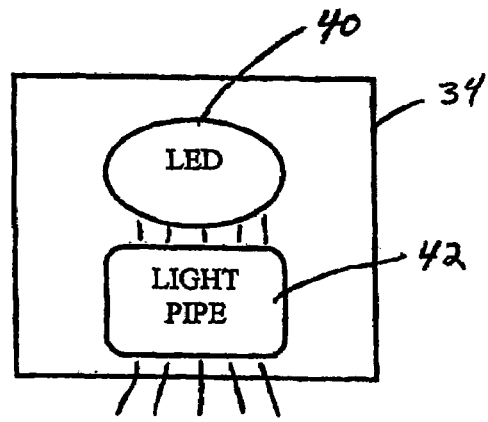
FIG. 2 is a diagrammatic view of an exemplary light in accordance with the principles of the subject invention.

Referring now to FIG. 2, there is depicted a block diagram of an exemplary form of the light 34. While the light 34 may take many forms, the preferred embodiment of the light 34 is an LED 40 with a light pipe 42. More preferably, the LED 40 is a blue LED that is focused into a light pipe 42. The light emanating from the light pipe 42 is focused onto the front panel array 28. While not shown in FIG. 2, the light 34 is connected to the circuitry/logic 36. Of course, other types of lights may be used.

The present variable intensity lighting device 33 may be provided on the television 20 either before the controller 32 has been built or after the controller 32 has been built. In the case where the variable intensity lighting device 33 is provided before the controller 32 has been built, the controller 32 includes the necessary hardware and software to allow the functioning of the lighting device 33 in the manner presented above. However, in accordance with an aspect of the subject invention, the lighting device 33 is most likely added to the television 20 after the controller has been built. In the case where the lighting device 33 is an add-on (i.e. it is added after the controller 32 is built), the circuitry/logic 36, in conjunction with the controller 32, provides for the automatic detection of whether the television includes the lighting device 33 (i.e. a light 34).

Figure 3:
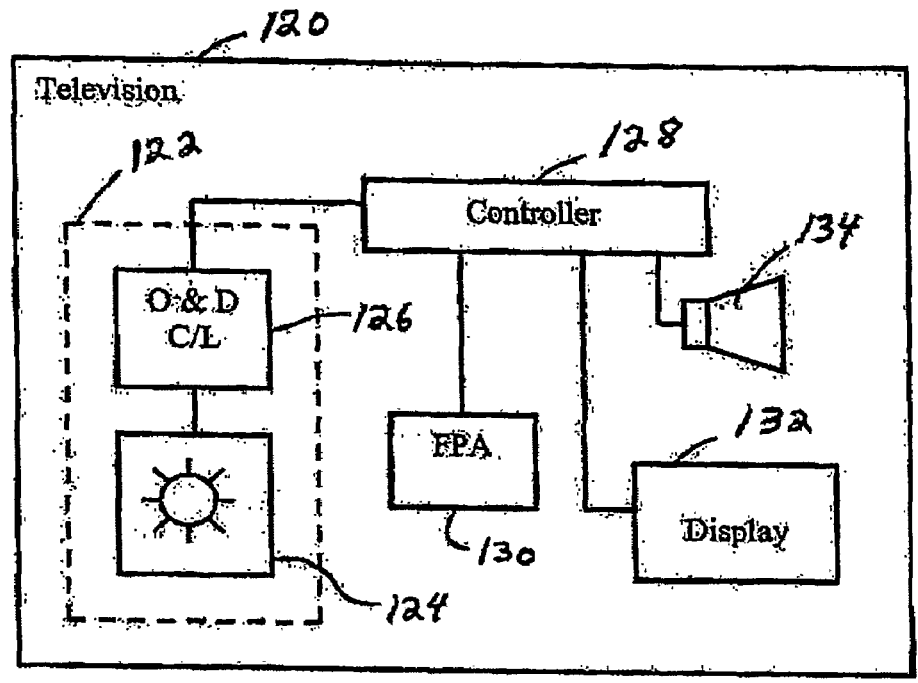
FIG. 3 is a diagrammatic view of a television apparatus having an add-on lighting device in accordance with the principles of the subject invention.

Referring to FIG. 3, there is depicted a block diagram of a television 120 in which a lighting device 122, in accordance with the principles of the subject invention, is an add-on. According to this aspect, the lighting device 122 is thus added to the television 120 after the television has been built. Particularly, the television 120 in FIG. 3 is representative of a television that has a pre-built controller 128 having hardware, memory and other components.

The television 120 has a front panel array or assembly 130 having user buttons for control of various television functions and/or features, a display 132, and one or more speakers 134. As represented by the dashed line, the television 120 has a lighting device 122 installed thereon. The lighting device 122 includes a light or light source 124 and operation and detection circuitry/logic 126. The light 124 is connected to the operation and detection circuitry/logic 126, while the operation and detection circuitry/logic 126 is connected to the controller 128. The controller 128 provides control signals to the light via the operation and detection circuitry/logic 126. The operation and detection circuitry/logic 126 provides a detection signal to the controller 128 when the light 124 is present. In one form, the lighting device 122 is connected to the controller 128 via two single wires. One single wire provides a detection signal from the operation and detection circuitry/logic 126 to the controller 128 while the controller 128 provides control signals to the operation and detection circuitry/logic 126 for lighting the light 124 and varying the intensity of the light 124 through the other single wire. Preferably, but not necessarily, the lighting device 122 provides six (6) or more levels of light intensity. These levels are selectable by the user via the on-screen menu of the television 120. Additionally, the controller 128 may provide simple on/off control of the light 124. Moreover, the operation and detection circuitry/logic 126 may provide standby power to the light 124 for powering the light 124 when the television 120 is off.

The operation and detection circuitry/logic 126 is also operative, configured and/or adapted to detect the presence of a light 124 and provide a detection signal or signals to the controller 128. Preferably, the detection of a light is accomplished automatically. In addition to automatic detection of the light 124, the subject invention provides for allowing the user the ability to control the light 124. Particularly the level of intensity (illumination level) of the light 122 is controllable by the user. In one form, this entails adding a menu, menu item or menu selection into (to) an existing on-screen menu structure of the television 120. The light control menu allows the customer to be able to vary the intensity of the light 34 within an intensity range. The light control menu may also allow the user to turn the light 124 on and off either at any time or at pre-set times. This is preferably accomplished by the user via the remote and one or more on-screen menus, choices and/or selections as added into the existing on-screen menu structure.

Figure 4:
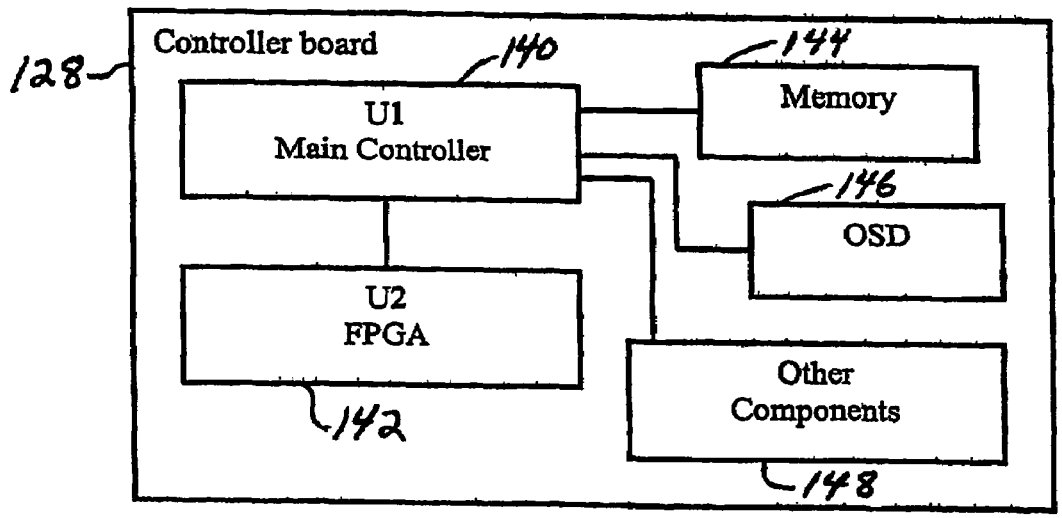
FIG. 4 is a block diagram view of an exemplary controller for the television apparatus of FIG. 3.

The presence of a light (e.g. LED diode) is determined after the controller 128 is booted up and/or during initial television set-up by the user/purchaser (i.e. during an initial user power-up of the television). Detection of a light causes the light control menu/software to load and be part of the television menu. Referring additionally to FIG. 4, a block diagram of an exemplary form of the controller 128 is depicted. It should initially be appreciated that the various blocks or boxes of the controller 128 represent functions and/or features of the controller 128 and/or to the extent translatable into circuitry/logic to actual integrated circuits, circuitry and/or logic. The television controller 128 includes a processing or main controller U1 140 that provides processing and control functions, a keyboard controller FPGA U2 142, memory 144, on-screen display processing 146, and other components 148. The memory 144 stores program instructions, data and other information that is used by the main controller 140 and other components or modules of the controller 128. The programming for automatic detection of the presence of a light, the programming for adding the light control menu to the main television menu, the programming for the main television menu, as well as other programming is retained in the memory 144. The memory 144 may be one or several types of memory and/or composed of various memory or storage components.

Figure 5:
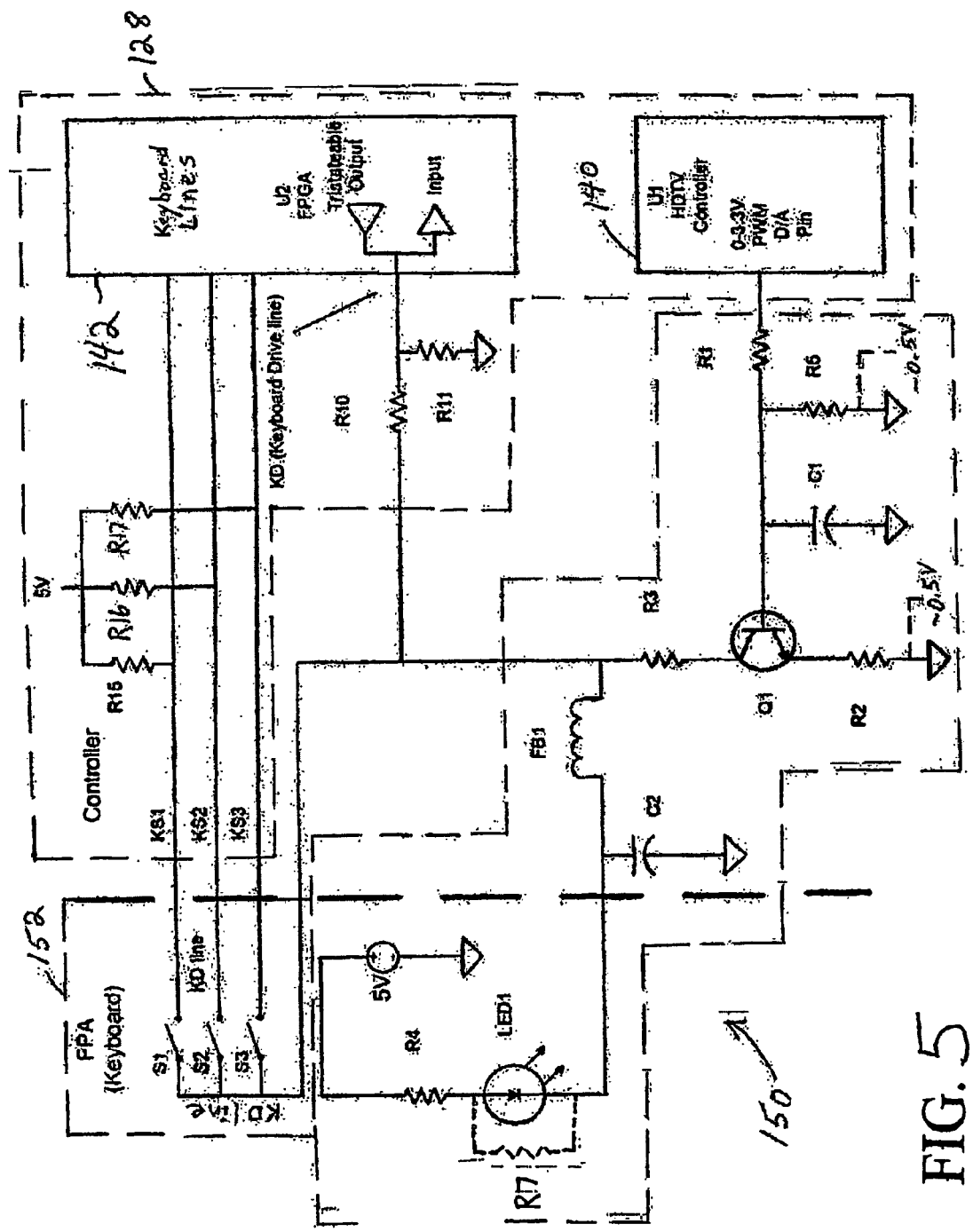
FIG. 5 is a schematic of exemplary circuitry/logic implementing the principles of the subject invention.

In one form, the process of automatic detection of a light may be performed in the following manner. Television software (program instructions) sets a D/A in the main controller 140 of the controller 128 to its minimum level and then reads an auto detect pin on the FPGA U2 142. Detection of a signal on the auto detect pin then causes the program instructions to load the light control menu into the main television menu (or activate the light control menu). In another form, and as depicted in the schematic of FIG. 5, discussed below, the process of automatic detection of a light may be performed by utilizing a pin having an existing connection/function and multiplexing an auto detect signal line thereto. In this case, when the auto detect routine is active, the KD line on U2, the FPGA, is set to an input. At the same time, the PWM generated in U1, the HDTV Controller, is initially set to max (to discharge C2, a 10 uF cap in the application). Next the PWM is set to its minimum value to allow the collector of Q1 to float. If LED1 is present, due to only a small amount of current in the LED, the voltage drop is ~2.5V, and the voltage at C2 is ~2.5V. This voltage is dropped by the R10/R11 divider to a voltage that is >2.0V, (the input threshold of the KD pin of U2 for a logic 1 is >2.0V). If LED1 is not present, R11, 100K in the application, pulls the KD line to <0.8V, the input threshold of the KD pin on U2. Once the autodetect process is complete, the KD pin on U2 is set to an output. In normal operation, the KD pin provides a drive signal to scan the keyboard. The autodetection routine is done every time the set is plugged in.

As indicated above, when the presence of a light such as a diode is detected, the main television on-screen menu is altered to include a light control menu. The light control menu allows user selection of light brightness (intensity). Because in this embodiment the controller 128 is pre-existing, the program instructions for the menu are provided and program instructions for not including the light control menu if light presence is not detected. Thus, the light control menu is provided in memory, but is only included in the main television menu when the light is detected.

Referring now to FIG. 5, there is depicted circuitry, generally designated 150, of exemplary lighting device circuitry/logic as it is connected or coupled to portions or components of the controller 128 and a keyboard or front panel array (FPA) 152. LED1 is preferably, but not necessarily, powered by a 5V standby supply to allow the LED1 to illuminate the keyboard 152 with the television apparatus on or off. A resistance in the form of a resistor R4 is provided between the 5V supply and the LED1. The resistor R4 is an electro-static discharge (ESD)/surge protection resistor to limit the current in the LED1 either during an ESD event to the keyboard 152 or to limit the current in the LED1 should the cathode of the LED1 be inadvertently grounded.

The circuitry 150 may optionally include (as represented by the dashed line) a resistance in the form of a resistor R7 across or parallel with the LED1. The resistor R7 is utilized to reduce the brightness variation of the LED1. Additional ESD protection is provided for the transistor Q1. Particularly, capacitance in the form of a capacitor C2, inductance in the form of an inductor FB1, and a resistance in the form of a resistor R3 are provided to the collector of the transistor Q1. Typical values may be 100 pf for the capacitor C2, 100 ohms at 100 MHz for the inductor FB1, and 24 ohms for the resistor R3.

The transistor Q1 is preferably a general purpose NPN transistor such as a BC847B. The transistor Q1 takes a base voltage (voltage at the base of Q1) from a capacitance in the form of a capacitor C1 wherein C1 preferably has a value of 1000 pf. The transistor Q1 drops the base voltage from C1 by a base-emitter junction of approximately 0.6 volts and applies the dropped voltage to the non-grounded side of a resistance in the form of a resistor R2 connected to the emitter of the transistor Q1. The resistor R2 may have a value of 27 ohms. Assuming a Q1 base voltage of 1.15 volts, the Q1 emitter voltage is approximately (~) 0.54 volts. The emitter voltage of ~0.54 volts across the resistor R2 of 27 ohms sets a constant current of approximately 20 mA through the resistor. Assuming that the transistor Q1 is kept in the active region, the current in LED1 is now set at ~20 mA, or its maximum rated DC value. By reducing the base voltage by 0.25 volts, the voltage on the emitter drops by 0.25 volts and the current in the resistor R2 drops to ~10 mA. This reduces the current in LED1 to ~10 mA.

To provide a varying base voltage on transistor Q1, a 0-3.3 volt D/A in U1, the HDTV controller IC, is used. The D/A is basically a PWM with a base frequency of 33 MHz. The D/A is controlled by a 32-bit register (of which only 16 are used) allowing up to 64K steps. In the present application, only six (6) steps are required. To limit the maximum current provided to the base of the transistor Q1 to 20 mA, the 0-3.3 volt output of the D/A is divided down by resistance embodied as a resistor R1 (preferably 18 K ohms) and a resistor R5 (preferably 10 K ohms). With the D/A set to its maximum output, the base voltage is then 1.15 volts. The PWM output is integrated by the RC time constant of the parallel combination of R1 and R5 with the capacitor C1 being the integrating capacitor. The period of the PWM is roughly 30 nsec. The RC time constant was chosen to be roughly 6 μsec. Any value less than 50 msec would not cause any noticeable delay from the user's standpoint. Due to the high speed of the PWM, resistors R1 and R5 and capacitor C1 need to be located right next to the PWM output pin. Once integrated, the transistor Q1 can be located anywhere on the board.

Due to the transistor Q1 turning off if the base voltage is less than roughly 0.6 volts, high and low endpoints for the control range of the light intensity were added to the memory (EEPROM) and read by the software (program instructions) controlling the D/A. The programmable endpoints allow the minimum and maximum values to be set later in the design stage based on the particular diodes (lights) and transistors being used. The software then allows the number of steps in between the endpoint to generate roughly linear intervals in current. Based on curves provided by the LED (diode) vendor, this should provide roughly linear steps in light intensity. Intensity level control is thus performed over a single wire or connection.

According to an aspect of the subject invention, the automatic detection of the presence of the diode LED1 is performed via a single wire or connection. Particularly, after automatic light presence detection, the pin of the integrated circuit U2 (FPGA) that is coupled to the light circuitry/logic 150 (through FB1) for automatic light detection becomes the keyboard 152 drive line that is controlled by another register in the FPGA (U2). During the auto detection process, if the input line is greater than a logic "1" level (i.e. 2V in the present case), the LED1 is assumed to be present. If the input line is less than 0.8 volts, it is assumed that the LED1 is not present. In the case that LED1 is present, although the LED would typically have a 3.5V drop at 20 mA, the current in the diode was limited to ~100 uA (by the series combination of R10 and R11), and the drop across the diode is ~2.5V. In the case that R7 (typically 2.4 K) is present to better control the current through the transistor Q1, the voltage on C2 is ~5V. To prevent the 4.0 volt maximum input voltage on the FPGA from being exceeded resistance in the form of resistor R10 (at preferably 63 K ohms) and resistor R11 (at preferably 100 k ohms) are provided at the FPGA pin. After going through the resistors R10 and R11, the voltage on the keyboard drive (KD) line (also the autodetect pin) is less than 4 volts, but greater than the 2V logic 1 threshold. If the LED1 is not present on the keyboard pin of the FPGA, resistor R11 ensures that the KD pin is pulled low.

With respect to light intensity variations, in order to reduce the variations in light output from the LED1 due to base-emitter variations on Q1, a resistance in the form of a resistor R7 (at preferably 2.4 K ohms) is preferably, but not necessarily, added. The resistor R7 provides a guaranteed minimum amount of current through the collector of Q1. In the present case, with an R7 value of 2.4 K ohms, the LED1 has an "on" voltage of approximately 2 volts. The resistor R7 forces a minimum of approximately 1 mA through the collector of Q1 before LED1 turns on. Without the minimum, there are not any standard means of sorting the transistors and a wider base-emitter spread will result.

Figure 6:
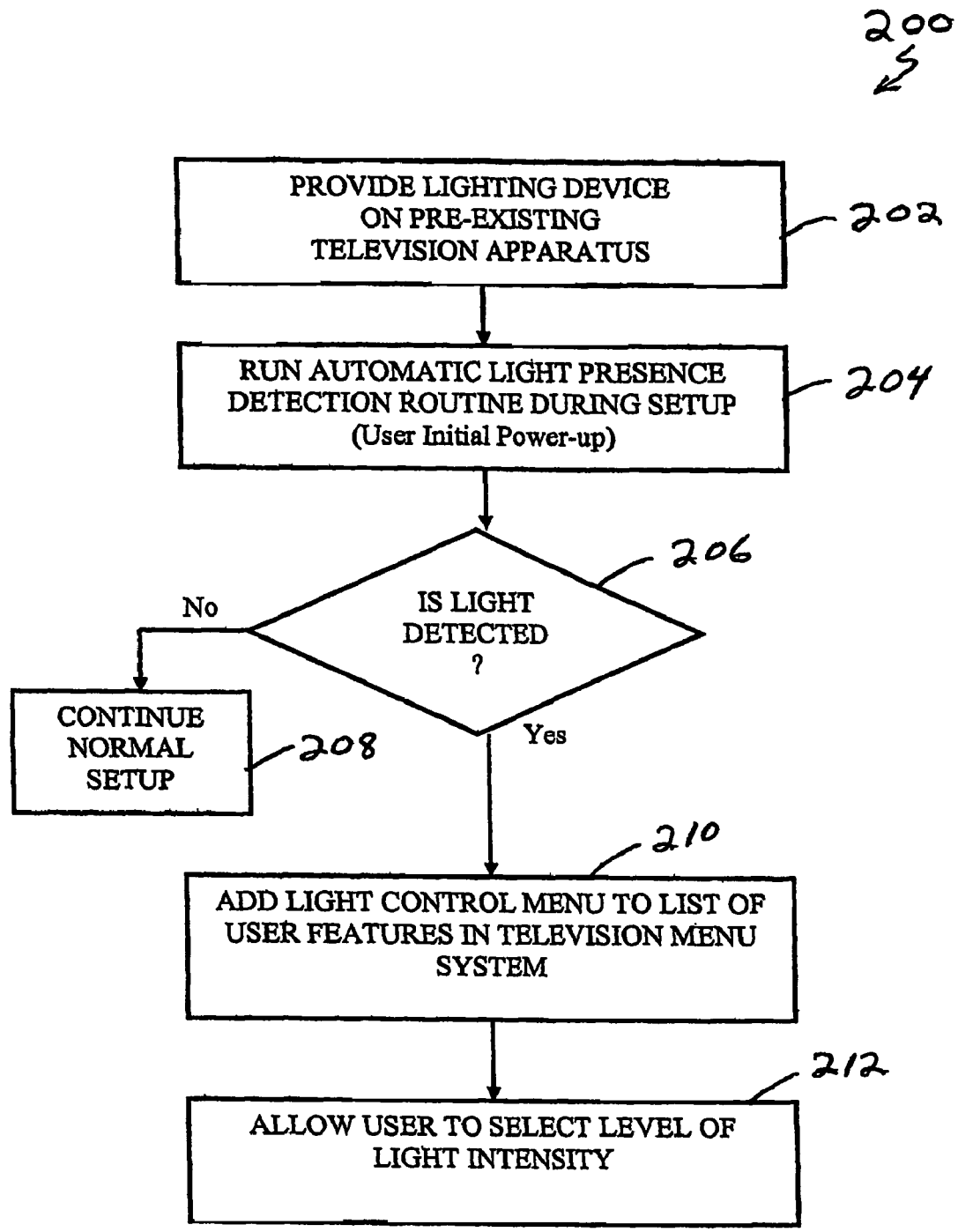
FIG. 6 is a flowchart of an exemplary manner of implementing the subject invention into a television apparatus.

Referring now to FIG. 6, there is depicted a flowchart, generally designated 200, of an exemplary manner of operation according to an aspect of the subject invention. In block or step 202, a lighting device is provided on a television apparatus that has a pre-existing controller. In block or step 204, an automatic light presence detection routine is run upon initial user power-up of the television apparatus. The routine checks for the presence of a top light (a front panel array light or external television apparatus user buttons light). Thus, in block 206 it is determined whether the light was detected. If the light was not detected (i.e. "No"), then the routine continues to block or step 208 where normal set-up continues. If, however, a light is detected (i.e. "Yes"), then the routine continues to block or step 210. In block or step 210 a light control menu is added to a list of user features in the television menu. Thereafter, in block or step 212, the light control menu allows the user to select the level or intensity (i.e. brightness) of the light.

Initial testing of the circuit showed that the variable current circuit worked well with the forward voltage on LED1 in the range of 3.5V +/− 0.2V. The limitation is due to the limited dynamic range of Q1. As the collector-emitter voltage on Q1 dropped below 300 mV, the Beta of Q1 dropped and the base drive needed for a particular emitter current increased. This resulted in the nominal 20 mA max of collector current varying by as much as 6 mA. To reduce the current variation without redesigning the entire circuit, the ground side of R2 and the ground side of R5 was changed to −0.5V. Since both the base and emitter circuit have the same offset, the circuit operation was essentially the same except that Q1 now has 0.5V more headroom between the collector and emitter. This change allowed the forward voltage spec on LED1 to be increased from 3.6V +/−0.2V to 3.6V +/−0.6V while maintaining a maximum current variation of 3 mA. The limit of −0.5V was chosen due to the input limitation on the PWM pin of the HDTV Controller. During the initial boot routine, the pin on the HDTV controller is tristated and the −0.5V is then present on the IC pin. The limit on the pin voltage is −0.5V, which resulted in the value of the negative supply being set to −0.5V.

Of course, it should be appreciated that the flowchart described above may have more or less steps in alternative embodiments of the procedure 200. As well, subsets of the above procedure 200 may implement the principles of the subject invention rather than the whole procedure. Variations are also contemplated.

While this invention has been described as having a preferred design, the present invention can be further modified within the spirit and scope of this disclosure. This application is therefore intended to cover any variations, uses, of adaptations of the invention using its general principles. Further, this application is intended to cover such departures from the present disclosure as come within known or customary practice in the art to which this invention pertains and which fall within the limits of the appended claims.

What is claimed is:

1. A television apparatus, comprising:
    a housing;
    a controller contained in the housing and operative to provide control of the television apparatus;
    a front panel array on an exterior of the housing and connected to the controller;
    wherein the controller is operative to detect one of a presence and an absence of a lighting device upon an initial power-up of the television apparatus, the lighting device, when present, being coupled to the controller and being capable of illuminating the front panel array at a plurality of illumination intensity levels;
    wherein if the controller detects the presence of the lighting device upon the initial power-up of the television apparatus, a light control menu is provided to allow a user to select a level of illumination intensity of the lighting device from the plurality of illumination intensity levels; and
    wherein if the controller detects the absence of the lighting device upon the initial power-up of the television apparatus, the light control menu is not provided.

2. The television apparatus of claim 1, wherein the lighting device comprises a light device connected to lighting circuitry that is connected to the controller via a single wire.

3. The television apparatus of claim 2, wherein the light device comprises a diode and a light pipe.

4. The television apparatus of claim 3, wherein said diode comprises a blue LED.

5. The television apparatus of claim 1, further comprising a single wire for driving the front panel array and for detecting the presence of the lighting device.

6. A television apparatus, comprising:
    a housing;
    means, situated in the housing, for controlling the television apparatus;
    front panel array means, situated on an exterior of the housing and connected to the controlling means, for providing access to features and/or functions of the television apparatus to a user;
    wherein the control means detects one of a presence and an absence of an illumination means upon an initial power-up of the television apparatus, the illumination means, when present, being coupled to the control means and being capable of illuminating the front panel array means at a plurality of illumination intensity levels;
    wherein if the control means detects the presence of the illumination means upon the initial power-up of the television apparatus, a light control menu is provided to allow a user to select a level of illumination intensity of the illumination means from the plurality of illumination intensity levels; and
    wherein if the control means detects the absence of the illumination means upon the initial power-up of the television apparatus, the light control menu is not provided.

7. The television apparatus of claim 6, wherein the illumination means comprises means for providing light connected to lighting circuitry that is connected to the control means via a single wire.

8. The television apparatus of claim 7, wherein the illumination means comprises a diode and a light pipe.

9. The television apparatus of claim 8, wherein said diode comprises a blue LED.

10. The television apparatus of claim 6, wherein the control means drives the front panel array means using a single wire, which is also used by the control means to detect presence of the illumination means.

11. A method of providing a variable intensity light for a front panel array of a television apparatus, the method comprising the steps of:

detecting one of a presence and an absence of a lighting device upon an initial startup of the television apparatus, the lighting device being capable of illuminating the front panel array at a plurality of illumination intensity levels when present;

providing a light control menu to an on-screen control menu of the television apparatus if the presence of the lighting device is detected, the light control menu allowing a user to select one of the plurality of illumination intensity levels for the lighting device; and providing the on-screen control menu without the light control menu if the absence of the lighting device is detected.

12. The method of claim 11, wherein the lighting device comprises a light and light circuitry.

13. The method of claim 11, wherein the step of detecting one of the presence and the absence of the lighting device upon the initial startup of the television apparatus and the step of providing the light control menu to the on-screen control menu of the television apparatus if the presence of the lighting device is detected each are accomplished via a single wire connection between the lighting device and a controller of the television apparatus.

14. The method of claim 11, wherein the detecting step uses a single wire, which is also served as a keyboard drive line for the front panel array.

* * * * *